United States Patent
Gupta et al.

(10) Patent No.: US 9,883,446 B2
(45) Date of Patent: Jan. 30, 2018

(54) METHOD AND APPARATUS FOR MOBILE MEDIA OPTIMIZATION

(75) Inventors: Gaurav S. Gupta, Redmond, WA (US); John M. Harris, Glenview, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 428 days.

(21) Appl. No.: 12/978,713

(22) Filed: Dec. 27, 2010

(65) Prior Publication Data

US 2012/0165015 A1 Jun. 28, 2012

(51) Int. Cl.
*H04W 24/00* (2009.01)
*H04W 36/32* (2009.01)
(Continued)

(52) U.S. Cl.
CPC ............ *H04W 36/32* (2013.01); *H04W 24/02* (2013.01); *H04W 28/24* (2013.01); *H04W 36/30* (2013.01)

(58) Field of Classification Search
CPC ..... H04W 24/00; H04W 24/02; H04W 24/04; H04W 24/10; H04W 36/30; H04W 36/32; H04W 28/24
(Continued)

(56) References Cited

U.S. PATENT DOCUMENTS 7,072,959 B2 * 7/2006 Huart ...................... H04L 29/06
370/352
7,272,128 B2 9/2007 Harris et al.
(Continued)

FOREIGN PATENT DOCUMENTS

CN 1311961 A 9/2001
EP 2066143 A1 6/2009
(Continued)

OTHER PUBLICATIONS

White Paper: The Role of Deep Packet Inspection in Mobile Networks, Using IP Service Control to Innovate and Differentiate in a Competitive Mobile Landscape, Arbor Networks, http://www.cellular-news.com/story/30531.php, copyright 1999-2008, all pages.

(Continued)

*Primary Examiner* — Wayne Cai
(74) *Attorney, Agent, or Firm* — Lowenstein Sandler LLP

(57) ABSTRACT

A method and apparatus for optimizing the mobile media received by a mobile device is disclosed. The apparatus operates with a radio access network, a mobile device operating in the radio access network, and a media server providing mobile media data to the mobile device wherein the mobile device connects to the media server using the radio access network. The apparatus includes a optimization application server coupled to the radio access network. The optimization application server includes positioning indexed performance information based on the positioning information and performance of a plurality of mobile devices operating in the radio access network. The optimization application server triggers adjustments to a parameter at least one of the radio access network, the mobile device and the media server by comparing the location of the mobile device in the radio access network to the optimization application server and sending a message to the radio access network to adjust the parameter.

19 Claims, 4 Drawing Sheets

(51) Int. Cl.
 *H04W 24/02* (2009.01)
 *H04W 28/24* (2009.01)
 *H04W 36/30* (2009.01)

(58) Field of Classification Search
 USPC ............ 455/423, 456.3, 456.1–456.6, 404.2;
 709/226, 231–232
 See application file for complete search history.

(56) References Cited

U.S. PATENT DOCUMENTS

| | | | |
|---|---|---|---|
| 7,637,668 | B2 | 12/2009 | Yamashita |
| 7,796,999 | B1 | 9/2010 | Martin et al. |
| 1,297,358 | A1* | 12/2010 | Harrang et al. ............ 709/226 |
| 7,894,370 | B2* | 2/2011 | Mukraj et al. ............... 370/254 |
| 7,937,382 | B2* | 5/2011 | Soldan et al. ............... 707/705 |
| 8,019,886 | B2* | 9/2011 | Harrang et al. ............ 709/232 |
| 2004/0047290 | A1 | 3/2004 | Komandur et al. ......... 370/230 |
| 2006/0105764 | A1* | 5/2006 | Krishnaswamy ....... H04L 45/22 455/424 |
| 2007/0091920 | A1 | 4/2007 | Harris et al. |
| 2007/0263070 | A1 | 11/2007 | Harris |
| 2009/0100190 | A1 | 4/2009 | Besombe et al. |
| 2009/0143065 | A1* | 6/2009 | Mattila ......................... 455/423 |
| 2009/0234857 | A1 | 9/2009 | Barault et al. |
| 2010/0036965 | A1* | 2/2010 | Kim ..................... H04L 65/602 709/231 |
| 2010/0214923 | A1 | 8/2010 | Vivanco et al. |

FOREIGN PATENT DOCUMENTS

| | | | |
|---|---|---|---|
| WO | 0007384 A1 | 2/2000 | |
| WO | WO 2011119439 A2 * | 9/2011 | ............ H04W 4/02 |

OTHER PUBLICATIONS

Ortiva Wireless: "Defining Quality of Experience for Video Delivered over Mobile Networks", Copyright 2004-2007, all pages.
Apposite Technologies: "Linktropy WAN Emulator Helps Ortiva Optimize Wireless Broadband Video", Los Angeles, CA, Aug. 29, 2007, all pages.
Aruba Networks: "Broadcast Quality Video Over Wireless", Aruba Video over WLAN, www.arubanetowrks.com, AB_VIDEO_US_102909, all pages.
wiMax.com.blog.clearwire, "Cleariwire Provides Additional Details on Its 4G Developer Program", http://www.wimax.com/commentar/blog/blog-2009/december-2009/clearwire-provides-additional-details-on-its-4g-developer, Jun. 15, 2010, all pages.
Open Mobile Video Coalition,www.openmobilevideo.com, Jun. 15, 2010, all pages.
FLOTV, Program Guide, Http://www.flotv.com/whats-on-flo-tv/guide, Jun. 15, 2010, all pages.
Patent Cooperation Treaty, International Search Report and Written Opinion of the International Searching Authority for International Application No. PCT/US2011/066341, dated Mar. 16, 2012, 15 pages.

* cited by examiner

METHOD AND APPARATUS FOR MOBILE MEDIA OPTIMIZATION

FIELD OF THE INVENTION

The present relates generally to media transmissions in a radio access network and, in particular, to improving the media experience by adapting the wireless conditions based on the position of the mobile device receiving media.

BACKGROUND

Mobile devices operate in communication networks that provide various types of services to users. For example, video and audio streaming services as well as internet access are often offered to users of mobile devices. In video streaming, an effectively continuous stream of video images is provided to users of the mobile devices is that these users may view movies, television programming or conference calls in substantially real time. Video steaming can be provided using internet access. Other types of services that provide substantially real time and continuous data to a mobile device can be accessed using the internet. In audio streaming, a stream of audio packets may be sent to the user to provide, for instance, similar services for music or radio programming services.

Streaming video and audio and other internet services consume significant amounts of system capacity. In addition, mobile media streaming is anticipated to only grow in the future. The ability to provide these services to the mobile devices and the quality of these services may depend upon operating conditions of the network and the amount of data that is streaming. For instance a mobile station may operate at the edge of a coverage area, and experience poor radio frequency (RF) operating conditions. When the mobile device experiences poor operating conditions and there is a significant amount of media services being provided, the media services provided to the user may be terminated or the Quality-of-Service (QoS) may be degraded.

Unfortunately, previous systems have not always considered operating conditions of the network and media conditions when providing media services to users. Consequently, as operating conditions of mobile devices deteriorate poor or dropped coverage may occur. Media optimization can also be performed, but these methods can be expensive and do not perform up to expectations. Media optimization can complicate performance on the radio access network by causing pre-handover traffic pre-emption, changing bit-rates, codecs and protocols. Media optimization may not work with proprietary codecs and encrypted video and audio streams. In view of the foregoing, there is a need for an improved media optimization that works with a radio access network.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
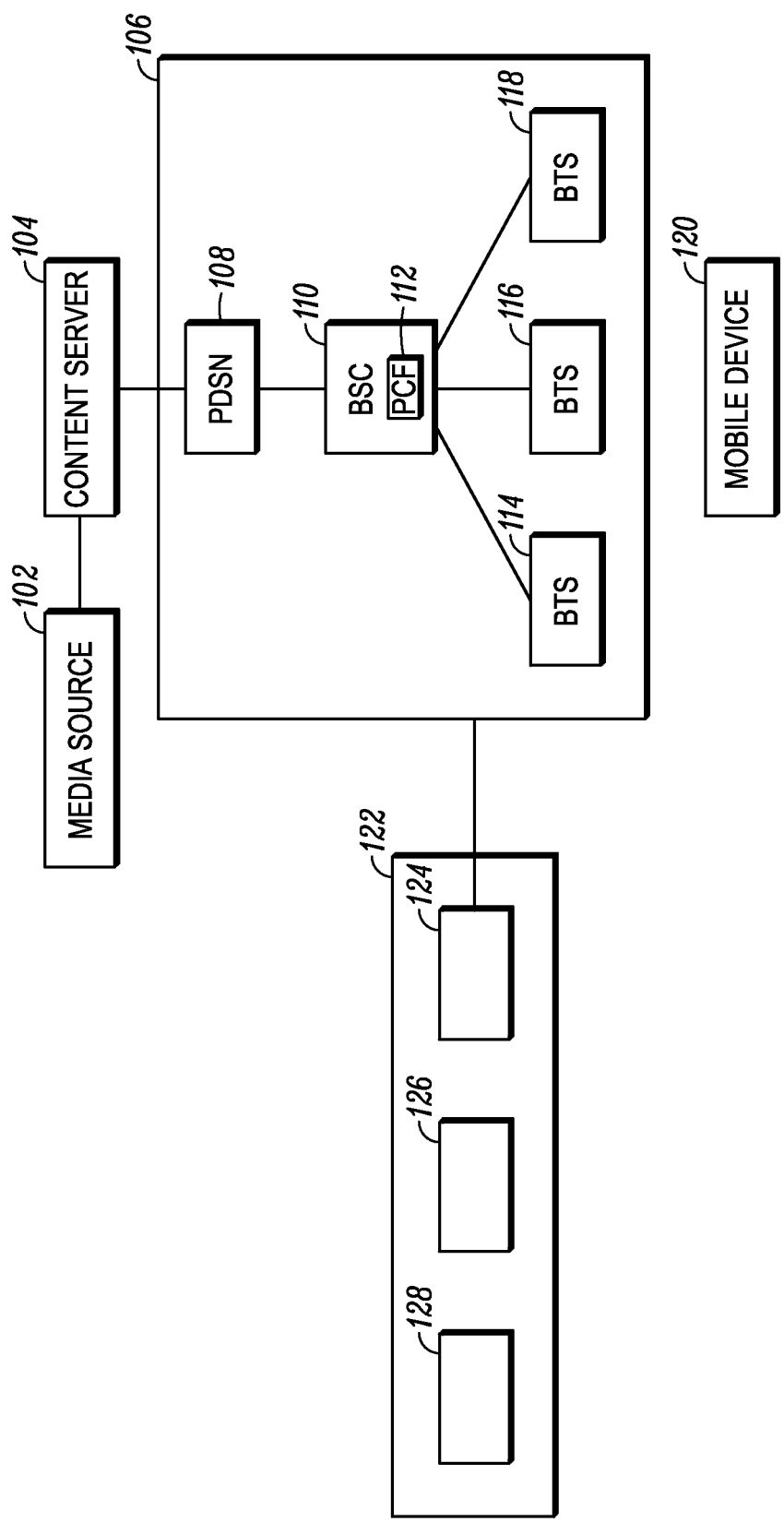
FIG. 1 is an example of a block diagram of a system including a wireless communication network and optimization application server for optimizing mobile media in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to method and apparatus for mobile media optimizations. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of mobile media optimization described herein. The non-processor circuits may include, but are not limited to, a radio receiver, a radio transmitter, signal drivers, clock circuits, power source circuits, and user input devices. As such, these functions may be interpreted as steps of a method to perform mobile media optimization. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The embodiments that are described relate to an apparatus such as the disclosed optimization application server that an interface to a radio access network and a controller coupled to the interface wherein the controller being adapted to send messages to the radio access network from the interface. The optimization application server also includes a memory device coupled to the controller wherein the memory device stores positioning indexed performance information related to the performance of a mobile device at a position in the radio access network. The controller compares a position of a mobile device operating in the radio access network with the stored positioning indexed performance information and triggers an adjustment for the performance of the mobile device operating in the radio access network. The adjustment is triggered by the server sending a message to the radio access network through the interface to optimize the performance of mobile media on the mobile device.

In an embodiment, the controller compiles the positioning indexed information from positioning information of a plurality of mobile devices operating in the radio access network and performance information of a plurality of mobile devices operating in the radio access network. Alternatively, the controller compiles performance information that includes data from at least one of the radio access network, the plurality of mobile device and a media source that provides the mobile media to the mobile device.

The optimization application server can trigger an adjustment to a parameter of at least one of the radio access network, the mobile device and the media source. The message can be sent to the radio access network to adjust a parameter of at least one of the radio access network, the mobile device and the media source. The message can also trigger a handover of the mobile device from a first cell in the radio access network to a second cell in the radio access network or a handover of the mobile device from a first radio access network technology and a second radio access network technology. In another embodiment, the message triggers an adjustment of a parameter of a second mobile device. In addition, the comparison of the position of the mobile device with the stored positioning indexed performance information predicts the performance of the mobile device.

A method of using the optimization application server is also disclosed. The method includes receiving position information of a plurality of mobile devices operating in a radio access network and receiving performance information of the plurality of mobile devices operating in the radio access network. In addition, the method includes compiling a database of positioning indexed performance information using the received position information and the received performance information and comparing the position of a mobile device operating in the radio access network with the position indexed performance information. The method triggers an adjustment in the performance of the mobile device operating in the radio access network based on the comparison wherein the adjustment is based on information in the database and on the configuration and performance of the radio access network. The method also sends a message to the radio access network to adjust the performance of the mobile device operating in the radio access network.

The optimization application server is also a part of a system that includes a radio access network, a mobile device operating in the radio access network and a media server providing mobile media data to the mobile device wherein the mobile device connects to the media server using the radio access network. The a optimization application server coupled to the radio access network and includes positioning indexed performance information based on the positioning information and performance of a plurality of mobile devices operating in the radio access network. The optimization application server triggers adjustments to a parameter at least one of the radio access network, the mobile device and the media server by comparing the location of the mobile device in the radio access network to the optimization application server and sending a message to the radio access network to adjust the parameter.

Turning to FIG. 1, one example of a system 100 for optimizing mobile media performance is described. A media source 102 is coupled to a content server 104. The content server 104 is coupled to a radio access network (RAN) 106. The RAN 106 can include a Packet Data Serving Node (PDSN) 108. A base station controller (BSC) 110, which can include a Packet Data Function (PDF) 112, is coupled to the PDSN 108 and Base Transceiver Stations (BTSs) 114, 116, 118. Any of the BTSs 114, 116, 118 can be wireless connected to a mobile device 120. As can be appreciated, the RAN 106 can include other infrastructure equipment that is necessary as a part of the wireless communications but do not need to be described in order to understand the invention as described herein. In addition, the system 100 includes an optimization application server 122 that is couples to the RAN 106 and is accessible by the components of the RAN 106.

The media source 102 may be a service, device, or combination of services or devices that provide media services. For example, the media source may provide high bit-rate video, commercial advertisements, highlight video clips, replay video clips, audio, music, slides, video XML streams, media with various audio and motion thresholds (e.g., from security cameras), educational media, media with a reduced amount of feature changes, or any other type of media. The media may be provided in a single or multiple media streams.

The content server 104 determines where to supply the media. The content server 104 also receives and evaluates operating conditions and determines the type of media to provide based upon these operating conditions. Alternatively, the functionality may be provided at clients of the server 104 (e.g., the mobile devices).

The RAN 106 provides the functions of a wireless communication network. The RAN 106 can be a part of any of the standardized wireless communications networks including TDMA, CDMA, GSM, 3G and 4G communication networks.

The PDSN 108 provides switching functions in the network. The presence server 106 provides presence information concerning whether a user is available or unavailable. The BSC 110 routes communications to and from various BTSs. The PCF 112 provides for control and processing of packets.

The BTSs 114, 116 and 118 provide functionality that allows communications to occur between the BSC 110 and mobile devices. For example, the BTSs 114, 116 and 118 may include base stations, receivers and transmitters or other types of equipment to support these functions.

The mobile device 120 provides access to the RAN for an end user. For example, the mobile devices can be one of a cellular phone, smartphone, laptop, tablet computer, etc. that includes a transceiver, antenna, controller, memory and user interface.

The optimization application server 122 provides functionality to the system including the RAN 106 and the mobile devices, to optimize the mobile media experience for the end user. The optimization application server includes positioning indexed information that is compiled from the RAN 106 and the mobile devices and triggers adjustment in RAN and mobile device parameters based on the location of the mobile device in the RAN. Location and position of the mobile device in the RAN can be determined using known GPS and other positioning techniques. In an embodiment, the adjustment can be scheduled according to a number of factors including timing, positioning and direction of the mobile device and network conditions.

As can be seen in FIG. 1, the optimization application server 122 is separate from and is not a part of the RAN 106 and the wireless communication network. The optimization application server 122 is therefore independent from the RAN 106 and compiles information from the RAN 106 and the mobile device 120 separately from the operation of a wireless communication network. In addition, the optimization application server 122 triggers adjustments by making suggestions to the RAN and the mobile devices instead of making actual changes to the operation of the network.

In one example of the operation of system of FIG. 1, at least one operating condition associated with an end user associated with the mobile station 120 is obtained by the content server 104. Based upon the operating condition, a high bit-rate media feed or a low bit rate media feed may be made to the end user 120 from the media source 102

The RF operating conditions for the radio access network and the mobile device may be determined using a number of approaches. For example, the number of bars on the display of a mobile station may be used as an indication of the operating conditions. Further, the number of legs of a software handoff, a higher mobility, a best average estimate for an interval prior to the next decision, or a poor Eb/Io ratio may be used as indications of the operating conditions. Other examples of approaches to determine operating conditions are possible.

The media feed may be any number of different types of media. For example, music may be used. In still another example, background music may be used. In another example, if video is being received from a camera, then the amount of camera angle, location, or zoom changes may be reduced or eliminated. In another example, the frame offsets may be staggered. Other examples are possible.

In another example, when the media source 102 is transmitting high bit rate video to an end user, the conditions of any link may be examined. If the conditions deteriorate on the link, the media may be switched to low bit-rate media.

In another example, the source 102 may be a wireless video server that receives video streams from many sources. Each video stream may receive a priority or Quality-of-Service (QoS) indicator. The video server may select the highest priority feed. In another approach, when many RF conditions are good, but some RF conditions are worse, the number of camera changes (e.g., angle, location, and zoom changes) may be reduced.

The optimization application server 122 can perform functions similar to the content server 104. In an embodiment, the optimization application server 122 includes an interface 124 to connect to the RAN and receive information such as positioning information of mobile devices operating in the RAN as well as information on the network conditions, the mobile device conditions and the mobile media related to the mobile devices operating in the RAN. The optimization application server 122 also includes a memory 126 that stores the information received from the RAN and a controller 128 that processes the data in the stored in the memory 126 in order to optimize the mobile media experience for the users of the mobile devices 120 as described.

Figure 2:
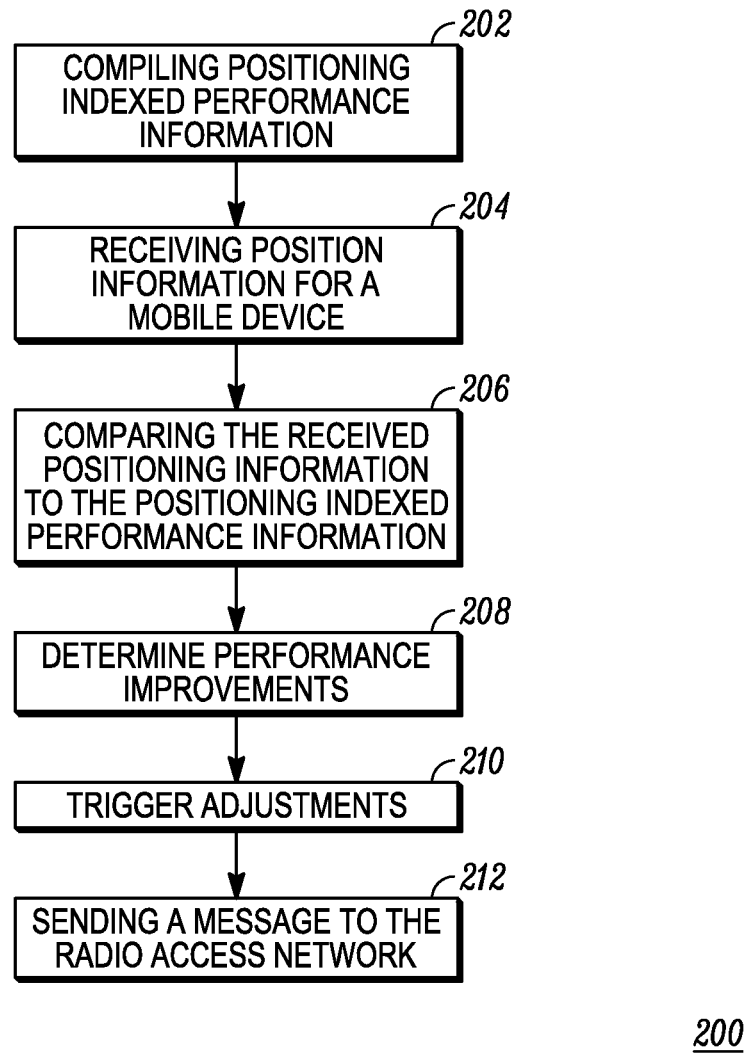
FIG. 2 is a flow chart showing a method for optimizing mobile media using a optimization application server in accordance with some embodiments of the invention.

FIG. 2 is a flow chart 200 that demonstrates the operation of the optimization application server 122. As is understood, the steps of operation can also be performed by the content server 104 or other apparatus that can receive data from the RAN 106 including positioning information and network condition information. The method begins by compiling 202 the necessary data regarding the RAN 106 into positioning indexed performance information by correlating the positioning data of mobile devices operating in the RAN with the network conditions and mobile device conditions for the mobile devices at that position in the RAN. Mobile media performance information can also be correlated with the positioning data. The positioning indexed performance information is stored in a database that is kept on the optimization application server's memory 126, and will be described in more detail below.

The method also includes the optimization application server 122 receiving 204 positioning information for a specific mobile device 120 that is operating in the RAN. The optimization application server's controller 128 compares 206 the positioning information for the specific mobile device with the positioning indexed performance information. Based on the results of the comparison, the optimization application server 122 can determine 208 performance improvements for the mobile device 120, the RAN 106 and the media source 102. With the use of the optimization application server and the positioning indexed performance information, comparisons can be used between a first mobile device and a second mobile device that trigger 210 adjustments for the mobile devices individually or collectively.

In an embodiment, the optimization application server 122 can also determine performance improvements for the RAN 106 as it operates with the mobile device 120. In addition, the optimization application server 122 can anticipate mobile device parameters to optimize mobile media performance based on the actual position and an expected position of the mobile device in the RAN 106 based on the movement of the mobile device 120.

The method continues by sending or transmitting 212 a message to the RAN 106 for use by the mobile device 120 to adjust a mobile device parameter. In an embodiment, the message can also be sent to the RAN to trigger adjustment of a parameter of the RAN 106 or the media source 102. The message can include timing information to schedule the adjustment of the mobile device, RAN or media source. Thus, the RAN 106 and the mobile device 120 do not rely only on traditional measurements determined by the RAN 105 to adjust RAN and mobile device parameters. In an embodiment, the modifications to the RAN 106, mobile device 120 and the media source 102 can be based solely on the information received from the server 122 and received and from the application level from the mobile station instead of from the network.

As mentioned, the optimization application server 122 can trigger adjustments to the RAN and to the mobile device. In addition, the optimization application server can trigger adjustments to the media source 102. The media source can receive messages directly from the server 122 or through the RAN 106 to change the parameters of the media streaming from the server to mobile device. These changes can be based on the positioning index performance information, which as described below, includes information regarding the network conditions and well as mobile device conditions. In an embodiment, the optimization application server 122 can trigger adjustments to the media compression level and the bit rate for the media source. In addition, the content stream source can be changed as well as the amount of media that is prefetched as a part of the streaming process. As the optimization application server 122 is not a part of the RAN and it includes the compiled information from multiple sources, e.g. media source, RAN and mobile device, the server 122 is able to optimize the user experience from each of the components that allow the mobile device 120 to receive the mobile media.

Figure 3:
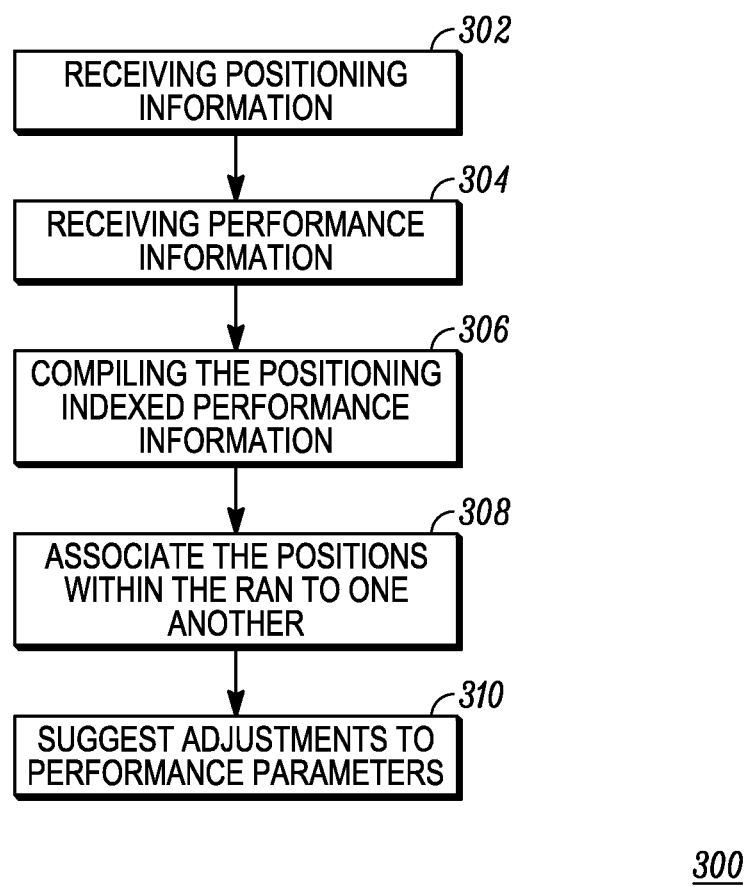
FIG. 3 is a flow chart showing the creation of the positioning indexed performance information in accordance with some embodiments of the invention.

FIG. 3 is a flow chart 300 illustrating how the positioning indexed performance information is compiled using position information for mobile devices 120 operating in the RAN 106 as well as the network conditions of the RAN and the mobile device associated with that position. In addition, positioning indexed performance information can take into consideration the functions and activities, e.g. directions of movement, type of media received, handover conditions, of mobile devices at given positions within the RAN.

The optimization application server 122 receives 302 wireless positioning measurements from each of a plurality of mobile devices that operate in the RAN thereby providing the location of the mobile device 120 in the RAN 106. The optimization application server 122 also receives 304 performance information for each of the plurality of mobile devices that operate in the RAN. The performance information corresponds to the received positioning information and can include network condition information as well as mobile device condition information. In an embodiment, mobile media performance related to a position in the network can be sent to server.

Network conditions can include data, such as QoS data, RF operating conditions, cell tower information (MNC, MCC, MAC, Cell ID, etc.), signal strength, cellular coverage, handover regions, etc., regarding the network and how mobile devices operate in the RAN at a given location. The network condition information can be from mobile device serving cells and neighboring cells. Mobile device condition information can include information regarding the operation, such as call types and functions, of the mobile device at a given location. Network conditions and mobile device conditions can also include handover information and directional orientation information.

As performance information and positioning information is obtained from a plurality of mobile devices, the optimization application server is able to compile 306 the positioning indexed performance information from the received information into an association of how mobile devices operates in the RAN at given location under given conditions. Moreover, the association can be made with the operation and functions of the mobile device at the given location.

The positioning indexed performance information can also associate 308 various positions within the RAN to one another and can make predictions on the performance of the mobile device and the usage of the mobile media. Thus, the positioning indexed performance information can trigger or suggest 310 adjustments to the performance parameters of the RAN 106, the mobile device 120 and the media source 102 when a mobile device is located at a given position and is understood to be moving in a given direction. These predictions and suggested adjustments are based on the location of a mobile device and the history of mobile devices operating in the RAN at given locations. The predictions and adjustments can also take into account the operations being performed by the mobile device including the type of call and the type of media streaming being received.

In view of the foregoing, the triggered adjustments can include adjustments to bit rates, QoS level, and delay profiles given the number of mobile devices in the network. The optimization application server can also preemptively raise or lower bit rates from the media source 102 to specific mobile devices. Such adjustments can increase the likelihood of receiving specific types of information and calls such as priority emergency calls. The positioning indexed performance information can cause handovers and other network operations to occur at alternative times than those that would occur if the RAN 106 operates without receiving the additional information. As the optimization application server 122 is separated from the RAN 106, the mobile device 120 and the media source 102, the server has the ability to interact with each element and optimize the performance of the mobile media by changing parameters across each of the elements.

In view of the foregoing, it is understood that the optimization application server 122 and the positioning indexed performance information provides increased performance of the network and the mobile media experience by preemptively adapting the performance of the media content and the configuration of the RAN 106 and mobile device. The adaptations are able to be performed based on the compilation of data on prior experiences of the mobile device in locations within the RAN 106. The optimization application server 122 adds knowledge of the mobile media and the mobile media codec's performance to the end-to-end sessions of the mobile device sessions with the media source based on given RF conditions and location. The use of server 122 can outperform network based solutions by having access to proprietary and non-proprietary information on the media sources and offered services. The server provides visibility into user events at the application layer that cannot be accessed by the RAN 106 as well as other mobile devices and other networks.

Figure 4:
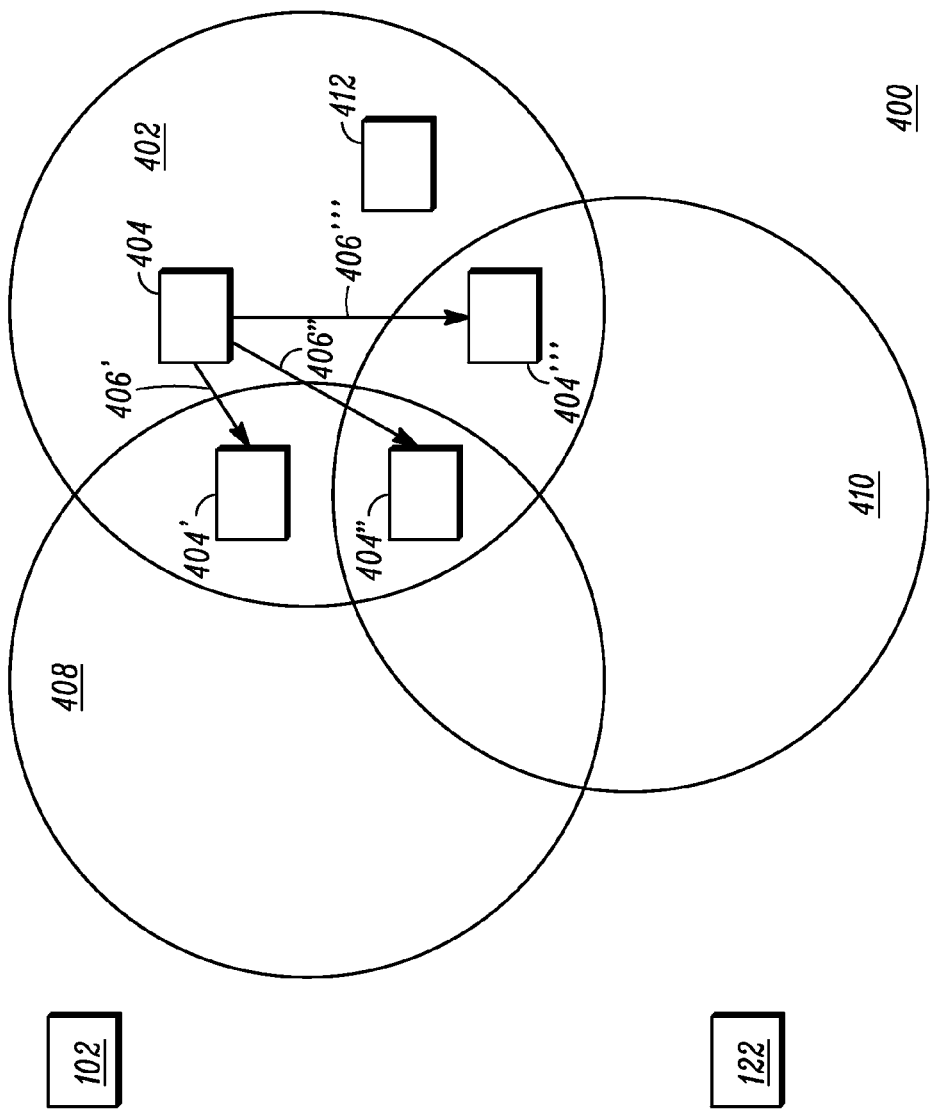
FIG. 4 is an example of a block diagram of the operation of a mobile device within a network using an embodiment of the invention.

Turning to FIG. 4, an example of the operation of the optimization application server starts with the creation of the positioning indexed performance information. FIG. 4 indicates a communication system 400 that includes multiple cells 402, 408, 410 and mobile devices 404. Media source 102 and optimization application server 122 are also provided. The media source 102 can be accessed by the mobile devices 404 using the network 400. The cells 402 can be for various types of network access including cellular coverage, WiFi coverage and other types of coverage.

As understood by the above description, the optimization application server obtains information from mobile devices operating in a RAN 106. The performance information includes network conditions, mobile device conditions and operations as well as mobile media data. This performance information is linked to the positioning information of the mobile device for the location of the mobile device in the RAN. Based on the performance and positioning information, positioning indexed performance information is stored in the optimization application server 122 for each location in the RAN. The positioning indexed performance information can be linked to the various cells and various types of access technology.

As a mobile device 404 moves through the network 400 it sends a message to the optimization application server 122 that include the mobile device's positioning information. This positioning information is compared to the positioning indexed performance information for the location found in the positioning information for the mobile device. If a mobile device is operating normally within a cell and is found to be in the center of the cell, or where there is stable network coverage for mobile devices, the server 122 will not make any adjustments to the mobile devices connections or to the mobile media received from the media source.

On the other hand, there are locations within the network 400 where network conditions and mobile device conditions deteriorate, and the optimization application server can trigger parameter adjustments for the mobile device, the RAN or the media source. Conditions for the network and mobile device can change due to environment, e.g. buildings and surrounding areas, or because of the cell configuration. Some of these conditions can cause a mobile device to be handed over from one cell to another cell or from one network technology to another network technologies. The positioning indexed performance information can be used to anticipate when a mobile device is to be handed over between cells or between networks.

In FIG. 4, the mobile device 404 is moving in the direction of arrows 406 and is approaching the edge of the cell 406 as well as cells 408 and 410. As seen, the mobile device 404 moves along the paths of arrows 406' 406'', 406''' to the position indicated by 404', 404'', 404'''. The optimization application server 122 is receiving positioning information for mobile device 404, and the comparison of that positioning information to positioning indexed performance information of cell 406 determines that a handover from cell 406 to cell 408 will occur based on the direction of the mobile device 404. Based on the knowledge of the positioning indexed performance information, which can include information regarding performance in cell 408, the optimization application server 122 sends can send messages to the network 400, the mobile device 404 and the media source 102. The messages to the network 400 and the mobile devices 404 are sent to change parameters of cell 406 and mobile device 404 to optimize the performance of mobile device 404 when it is in cell 408. The messages can also optimize the mobile media being received on the mobile device 404. In addition, the optimization application server 122 can send messages to the media source 102 to change the parameters of the mobile media received by the mobile device 404 when it is in cell 408.

In an embodiment, cell 410 can provide the mobile device access to media source 102 using a different technology from that provided by cell 406. The optimization application server 122 can include information regarding the different technology of cell 410 and can send messages to at least one of the cell 406, mobile device 408 and media source 102 to optimize the mobile media experience as the mobile device moves from cell 406 to cell 410. In the situation where cell 408 and 410 overlap, the optimization application server 122 can include information that can direct the network 400 and the mobile device 404 to hand over the mobile device to one or the other of cell 408 and 410. Such a decision can be made based on the network conditions and the performance of the mobile device in cell 408 or cell 410. The decision can be also based on the performance of the mobile media in cell 408 and 410. The compilation of the positioning indexed performance information can provide this information.

The optimization application server receives positioning information from mobile device 404 and mobile device 412 within the network 400. Using this information and the positioning indexed performance information, the optimization application server can also send messages to adjust the parameters of the cells, both mobile devices 404 and 412 as well as the media sources providing mobile media to the mobile devices.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. An optimization application server comprising:
an interface to a radio access network;
a controller coupled to the interface wherein the controller being adapted to send messages to the radio access network from the interface;
a memory device coupled to the controller wherein the memory device stores positioning indexed performance information which correlates positioning data of one or more mobile devices operating in the radio access network with network conditions, mobile media performance information, and mobile device conditions for the one or more mobile devices at a position in the radio access network, wherein the mobile media performance information comprises a plurality of events occurring at an application layer that are inaccessible to the radio access network and indicate a performance of a mobile media codec during a prior media streaming session; and
wherein the controller compares the position of a mobile device operating in the radio access network with the stored positioning indexed performance information including the mobile media performance information comprising the plurality of events at the application layer and triggers an adjustment by sending a message to the radio access network through the interface to the radio access network to optimize the performance of mobile media on the mobile device.

2. The optimization application server of claim 1 wherein the controller compiles the positioning indexed performance information from positioning information and performance information of a plurality of mobile devices operating in the radio access network.

3. The optimization application server of claim 2 wherein the controller compiles performance information that includes data from at least one of the radio access network, the plurality of mobile devices and a media source that provides the mobile media to the mobile device.

4. The optimization application server of claim 1 wherein the controller triggers an adjustment comprises triggering an adjustment to a parameter of at least one of the radio access network, the mobile device or a media source providing the mobile media.

5. The optimization application server of claim 1 wherein the message is sent to the radio access network to adjust a parameter of at least one of the radio access network, the mobile device and a media source providing the mobile media.

6. The optimization application server of claim 1 wherein the message triggers a handover of the mobile device from a first cell in the radio access network to a second cell in the radio access network.

7. The optimization application server of claim 1 wherein the message triggers a handover of the mobile device from a first radio access network technology to a second radio access network technology.

8. The optimization application server of claim 1 wherein the message triggers an adjustment of a parameter of a second mobile device.

9. The optimization application server of claim 1, wherein the controller further determines an expected position of the mobile device and compares the expected position with the stored positioning indexed performance information to predict the performance of the mobile device to trigger a preemptive adjustment.

10. A method in an optimization application server, the method comprising:
   receiving position information of a plurality of mobile devices operating in a radio access network;
   receiving performance information of the plurality of mobile devices operating in the radio access network;
   compiling a database of a positioning indexed performance information using the received position information and the received performance information, wherein the positioning indexed performance information correlates the received positioning information of the plurality of mobile devices operating in the radio access network with network conditions, mobile media performance information, and mobile device conditions for the plurality of mobile devices at positions in the radio access network, wherein the mobile media performance information comprises a plurality of events occurring at an application layer that are inaccessible to the radio access network and indicate a performance of a mobile media codec during a prior media streaming session;
   comparing a position of a mobile device operating in the radio access network with the position indexed performance information comprising the mobile media performance information;
   triggering an adjustment in the performance of mobile media on the mobile device based on the comparison, wherein the adjustment is based on information in the database; and
   sending a message to the radio access network to adjust the performance of mobile media on the mobile device.

11. The method of claim 10 wherein the compiling the database further comprises compiling performance information that includes data from at least one of the radio access network, the plurality of mobile device or a media source that provides the mobile media to the mobile device.

12. The method of claim 10 wherein triggering an adjustment for the performance of the mobile device operating in the radio access network further comprises triggering an adjustment to a parameter of at least one of the radio access network, the mobile device or a media source providing the mobile media.

13. The method of claim 10 wherein sending a message further comprises sending a message to adjust a parameter of at least one of the radio access network, the mobile device or a media source providing the mobile media.

14. The method of claim 10 wherein triggering an adjustment for the performance of the mobile device operating in the radio access network further comprises triggering a handover of the mobile device from a first cell in the radio access network to a second cell in the radio access network.

15. The method of claim 10 wherein triggering an adjustment for the performance of the mobile device operating in the radio access network further comprises triggering a handover of the mobile device from a first radio access network technology and a second radio access network technology.

16. The method of claim 10 wherein triggering an adjustment for the performance of the mobile device operating in the radio access network further comprises triggering an adjustment of a parameter of a second mobile device.

17. A system comprising:
   a radio access network;
   a mobile device operating in the radio access network;
   a streaming media server providing mobile media data to the mobile device wherein the mobile device connects to the streaming media server using the radio access network;
   an optimization application server coupled to the radio access network wherein the optimization application server includes positioning indexed performance information based on positioning information and performance of a plurality of mobile devices operating in the radio access network, wherein the positioning indexed performance information correlates the positioning information of the plurality of mobile devices operating in the radio access network with network conditions, mobile media performance information, and mobile device conditions for the plurality of mobile devices at positions in the radio access network, wherein the mobile media performance information comprises a plurality of events occurring at an application layer that are inaccessible to the radio access network and indicate a performance of a mobile media codec during a prior media streaming session; and
   wherein the optimization application server triggers an adjustment to a parameter of the streaming media server by comparing the position of the mobile device in the radio access network to the positioning indexed performance information comprising the mobile media performance information and sends a message to the streaming media server to adjust the parameter and optimize the performance of mobile media on the mobile device.

18. The system of claim 17 wherein the optimization application server compiles the positioning indexed performance information from performance information that includes data from at least one of the radio access network, the plurality of mobile device and a media source that provides the mobile media to the mobile device.

19. The system of claim 17 wherein the parameter triggers a handover of the mobile device.

* * * * *